(12) United States Patent
Palmquist et al.

(10) Patent No.: US 9,174,754 B2
(45) Date of Patent: Nov. 3, 2015

(54) INDUCTION SEALING DEVICE FOR HEAT SEALING PACKAGING MATERIAL FOR PRODUCING SEALED PACKAGES OF POURABLE FOOD PRODUCTS

(75) Inventors: Roland Palmquist, Åkarp (SE); Andrea Babini, Modena (IT); Håkan G. Andersson, Åkarp (SE); Ulf Danielsson, Svalöv (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 632 days.

(21) Appl. No.: 12/666,428

(22) PCT Filed: Jun. 27, 2008

(86) PCT No.: PCT/EP2008/058337
§ 371 (c)(1),
(2), (4) Date: Dec. 23, 2009

(87) PCT Pub. No.: WO2009/000928
PCT Pub. Date: Dec. 31, 2008

(65) Prior Publication Data
US 2010/0180545 A1 Jul. 22, 2010

(30) Foreign Application Priority Data

Jun. 28, 2007 (EP) .................................... 07425400

(51) Int. Cl.
*B65B 51/32* (2006.01)
*B23K 13/01* (2006.01)
(Continued)

(52) U.S. Cl.
CPC ............. *B65B 51/303* (2013.01); *B29C 65/368* (2013.01); *B29C 65/3656* (2013.01);
(Continued)

(58) Field of Classification Search
CPC .... B65B 9/207; B65B 51/227; B65B 51/306; B29C 65/04; B29C 65/32; B29C 65/36; B29C 65/46; B29C 66/08; B29C 66/3324; H05B 6/54; B29L 2009/00

USPC .............. 53/451, 551, DIG. 2, 374.3, 374.5, 53/374.6; 219/604, 609, 633, 635, 765, 219/770, 769, 777
See application file for complete search history.

(56) References Cited

U.S. PATENT DOCUMENTS 4,637,199 A * 1/1987 Steck et al. ..................... 53/451
4,704,509 A * 11/1987 Hilmersson et al. .......... 219/633
(Continued)

FOREIGN PATENT DOCUMENTS

| EP | 1231149 | 8/2002 |
| EP | 1270182 A1 | 1/2003 |

(Continued)

OTHER PUBLICATIONS

* International Search Report issued on Feb. 18, 2009 in International Application No. PCT/EP2008/058337 by the European Patent Office in its capacity as the International Searching Authority.
(Continued)

*Primary Examiner* — Stephen F Gerrity
*Assistant Examiner* — Eyamindae Jallow
(74) *Attorney, Agent, or Firm* — Buchanan Ingersoll & Rooney PC (57) ABSTRACT

An induction sealing device for heat sealing packaging material for producing sealed packages of pourable food products and fed in a first direction, the sealing device having an inductor device which interacts with the packaging material by at least one active surface; a supporting body made of heat-conducting material and housing the inductor device; an insert made of magnetic flux-concentrating material and housed in the supporting body; and a member made of plastic material, and having at least a first portion interposed, in the first direction, between the supporting body and the insert so as to be at least partly surrounded by the supporting body.

24 Claims, 4 Drawing Sheets

(51) Int. Cl.
    B65B 51/30    (2006.01)
    B29C 65/36    (2006.01)
    B29C 65/74    (2006.01)
    B29C 65/00    (2006.01)
    B65B 51/22    (2006.01)
    B29K 23/00    (2006.01)
    B29K 71/00    (2006.01)
    B29K 305/02   (2006.01)
    B29K 711/12   (2006.01)
    B29L 9/00     (2006.01)
    B29L 31/00    (2006.01)

(52) U.S. Cl.
    CPC .............. B29C65/745 (2013.01); B29C 66/001
       (2013.01); B29C 66/026 (2013.01); B29C
       66/1122 (2013.01); B29C 66/4312 (2013.01);
       B29C 66/72321 (2013.01); B29C 66/80
       (2013.01); B29C 66/8167 (2013.01); B29C
       66/81427 (2013.01); B29C 66/81431 (2013.01);
       B29C 66/81457 (2013.01); B29C 66/81461
       (2013.01); B29C 66/83543 (2013.01); B29C
       66/843 (2013.01); B65B 51/227 (2013.01);
       B29C 65/3668 (2013.01); B29C 66/81264
       (2013.01); B29C 66/8491 (2013.01); B29K
       2023/06 (2013.01); B29K 2023/086 (2013.01);
       B29K 2023/12 (2013.01); B29K 2071/00
       (2013.01); B29K 2305/02 (2013.01); B29K
       2711/123 (2013.01); B29K 2995/0067
       (2013.01); B29K 2995/0069 (2013.01); B29K
       2995/0089 (2013.01); B29L 2009/00 (2013.01);
       B29L 2009/003 (2013.01); B29L 2031/7166
                                            (2013.01)

(56) References Cited

U.S. PATENT DOCUMENTS

| | | | | |
|---|---|---|---|---|
| 4,787,194 A * | 11/1988 | Lancaster et al. | ................ | 53/469 |
| 4,817,366 A * | 4/1989 | Konzal et al. | ................... | 53/451 |
| 4,825,625 A * | 5/1989 | Hufford | ........................ | 53/451 |
| 4,891,929 A * | 1/1990 | Branchi | ........................ | 53/451 |
| 4,895,457 A * | 1/1990 | Lancaster et al. | ................ | 383/94 |
| 4,961,798 A * | 10/1990 | Hart et al. | ....................... | 156/86 |
| 5,016,426 A * | 5/1991 | Davis | ............................ | 53/554 |
| 5,025,123 A * | 6/1991 | Pfaffmann et al. | ........... | 219/604 |
| 5,031,380 A * | 7/1991 | Ueda | ............................ | 53/135.1 |
| 5,048,260 A * | 9/1991 | Raymond et al. | ........... | 53/370.8 |
| 5,110,040 A * | 5/1992 | Kalberer et al. | ........ | 229/125.14 |
| 5,154,430 A * | 10/1992 | Dureuil | ........................ | 53/433 |
| 5,155,980 A * | 10/1992 | Mansson et al. | ............... | 53/551 |
| 5,220,771 A * | 6/1993 | Burns | ........................... | 53/551 |
| 5,343,023 A * | 8/1994 | Geissler | ....................... | 219/661 |
| 5,347,792 A * | 9/1994 | Meli et al. | ...................... | 53/450 |
| 5,400,568 A * | 3/1995 | Kanemitsu et al. | ............ | 53/412 |
| 5,530,227 A * | 6/1996 | Matsen et al. | ................ | 219/633 |
| 5,577,369 A * | 11/1996 | Becker et al. | .................. | 53/474 |
| 5,591,369 A * | 1/1997 | Matsen et al. | ................ | 219/633 |
| 5,651,239 A * | 7/1997 | Kawano et al. | ................ | 53/550 |
| 5,678,390 A * | 10/1997 | Pruett et al. | ..................... | 53/450 |
| 5,680,747 A * | 10/1997 | Spatafora et al. | ............... | 53/477 |
| 5,710,414 A * | 1/1998 | Matsen et al. | ................ | 219/633 |
| 5,736,719 A | 4/1998 | Lawson et al. | | |
| 5,847,375 A * | 12/1998 | Matsen et al. | ................ | 219/635 |
| 5,889,263 A * | 3/1999 | Andersson | ................... | 219/633 |
| 5,894,709 A * | 4/1999 | Fosshage | ....................... | 53/450 |
| 5,901,529 A * | 5/1999 | Baur | ............................... | 53/428 |
| 6,007,658 A * | 12/1999 | Calvert | ......................... | 156/217 |
| 6,043,471 A * | 3/2000 | Wiseman et al. | ............. | 219/662 |
| 6,050,055 A * | 4/2000 | Calvert et al. | ................... | 53/300 |
| 6,085,495 A * | 7/2000 | Fontanazzi et al. | ............ | 53/551 |
| 6,234,777 B1 * | 5/2001 | Sperry et al. | .................... | 425/46 |
| 6,265,002 B1 * | 7/2001 | Blatter | .......................... | 426/108 |
| 6,319,243 B1 * | 11/2001 | Becker et al. | .................. | 604/518 |
| 6,505,664 B1 * | 1/2003 | Blundell et al. | ................. | 156/515 |
| 6,509,555 B1 * | 1/2003 | Riess et al. | ..................... | 219/633 |
| 6,571,850 B2 * | 6/2003 | Melheim | ...................... | 156/581 |
| 6,739,370 B2 * | 5/2004 | Melheim | ...................... | 156/581 |
| 6,876,896 B1 * | 4/2005 | Ortiz et al. | ..................... | 700/112 |
| 6,877,295 B1 * | 4/2005 | Benedetti et al. | ............... | 53/451 |
| 6,928,794 B2 * | 8/2005 | Hamer et al. | ................... | 53/450 |
| 7,059,100 B2 | 6/2006 | Babini et al. | | |
| 7,065,937 B2 * | 6/2006 | Tankersley | ...................... | 53/411 |
| 7,129,450 B2 | 10/2006 | Andersson | | |
| 1,413,520 A1 | 3/2008 | Kupfer et al. | | |
| 7,484,347 B2 * | 2/2009 | Konno et al. | ................... | 53/551 |
| 7,538,302 B2 | 5/2009 | Ferrari et al. | | |
| 7,617,658 B2 * | 11/2009 | Nemkov et al. | ................ | 53/551 |
| 8,844,250 B2 * | 9/2014 | Nemkov et al. | ................ | 53/477 |
| 2004/0182046 A1 | 9/2004 | Babini et al. | | |

FOREIGN PATENT DOCUMENTS

| | | |
|---|---|---|
| EP | 1413520 | 2/2006 |
| EP | 1385743 | 7/2008 |
| RU | 20299 | 4/2001 |
| RU | 2299842 | 5/2007 |
| UA | 76151 C2 | 2/2004 |
| UA | 81 801 C2 | 2/2008 |

OTHER PUBLICATIONS

* Written Opinion issued on Feb. 18, 2009 in International Application No. PCT/EP2008/058337 by the European Patent Office in its capacity as the International Searching Authority.
Decision to Grant issued by the Russian Patent Office on Oct. 1, 2012 in corresponding Russian Patent Application No. 2010102789, and English translation thereof.
Official Decision to Grant issued on Jun. 12, 2012 by the Ukrainian Patent Office in Ukrainian Application No. 200913607.

* cited by examiner

Fig.2

Fig. 4

INDUCTION SEALING DEVICE FOR HEAT SEALING PACKAGING MATERIAL FOR PRODUCING SEALED PACKAGES OF POURABLE FOOD PRODUCTS

TECHNICAL FIELD

The present invention relates to an induction sealing device for heat sealing packaging material for producing sealed packages of pourable food products.

BACKGROUND ART

Many pourable food products, such as fruit juice, UHT milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

The tube portion gripped between each pair of jaws is heat sealed by heating means fitted to one of the jaws, known as the sealing jaw, and which locally melt the two layers of heat-seal plastic material gripped between the jaws.

More specifically, packaging material in which the layer of barrier material comprises a sheet of electrically conductive material, e.g. aluminium, is normally heat sealed by a so-called induction heat-sealing process, in which, when the tube is gripped by the two jaws, loss current is induced in, and locally heats, the aluminium sheet, thus melting the heat-seal plastic material locally.

More specifically, in induction heat sealing, the heating means substantially comprise an inductor powered by a high-frequency current generator and substantially comprising one or more inductor bars made of electrically conductive material, extending parallel to the second direction, and which interact with the tube material to induce a loss current in it and heat it to the necessary sealing temperature.

The other jaw, known as the counter-jaw, on the other hand, is fitted with pressure pads made of elastomeric material, and which cooperate with the inductor bars to heat seal the tube along a relative transverse sealing band.

Sealing jaw sealing devices comprising inductors of the above type are known.

More specifically, known sealing devices substantially comprise a plastic supporting body connected integrally to the sealing jaw and defining two front seats for housing respective inductor bars; and an insert made of magnetic flux-concentrating material—in particular, a composite material comprising ferrite—and housed inside the supporting body, close to the inductor bars.

More specifically, the plastic supporting body cooperates with the insert, and defines a peripheral portion of the sealing device surrounding the inductor bars and the insert of magnetic flux-concentrating material.

The Applicant has observed that, due to the mechanical loads to which it is subjected in use, the supporting body is susceptible to cracking, which reduces the working life of the sealing device and limits use of the device on high-speed packaging units.

DISCLOSURE OF INVENTION

It is an object of the present invention to provide an induction sealing device, for heat sealing packaging material for producing sealed packages of pourable food products, designed to provide a straightforward, low-cost solution to the aforementioned drawback typically associated with the aforementioned known sealing devices.

According to the present invention, there is provided an induction sealing device, for heat sealing packaging material for producing sealed packages of pourable food products, as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
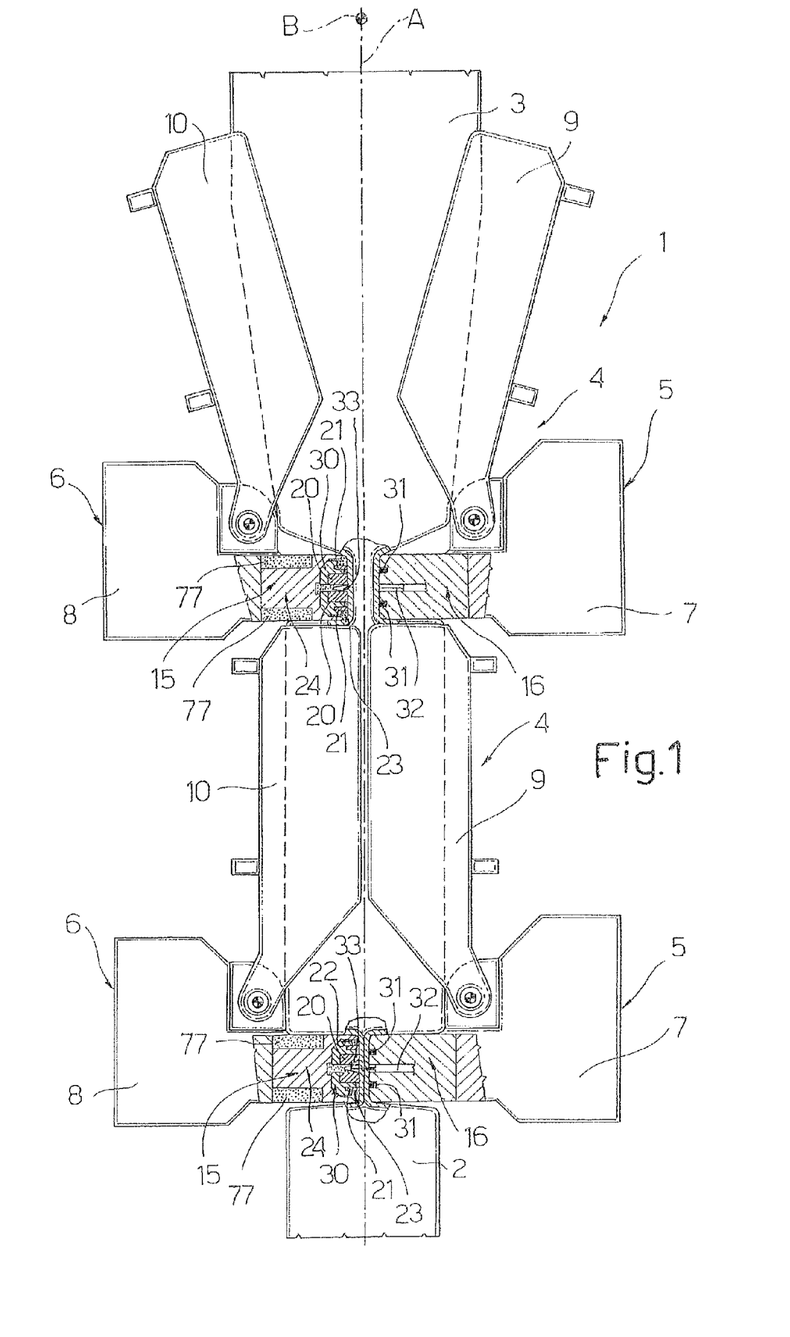
FIG. 1 shows a side view, with parts removed for clarity, of a packaging unit for producing aseptic sealed packages of pourable food products from a tube of packaging material fed along a vertical forming path.

Number 1 in FIG. 1 indicates as a whole a packaging unit for producing aseptic sealed packages 2 of a pourable food product, such as pasteurized or UHT milk, fruit juice, wine, etc., from a tube 3 of packaging material.

The packaging material has a multilayer structure (not shown), and comprises a layer of fibrous material, normally paper, covered on both sides with respective layers of heat-seal plastic material, e.g. polyethylene; and the side of the packaging material eventually contacting the food product in package 2 also has a layer of electrically conductive barrier material, e.g. aluminium, in turn covered with one or more layers of heat-seal plastic material.

Tube 3 is formed in known manner upstream from unit 1 by longitudinally folding and sealing a web of heat-seal sheet material, is filled with the sterilized or sterile-processed food product, and is fed by known devices (not shown) along a vertical path in a direction A.

Unit 1 comprises two forming assemblies 4, which move vertically along respective rails (not shown) and interact cyclically and successively with tube 3 to grip it at equally spaced cross sections and perform induction heat-seal and cutting operations on tube 3.

Each forming assembly 4 substantially comprises a slide (not shown) which runs along the respective rail; and two jaws 5, 6 (only shown as necessary for a clear understanding of the present invention) hinged to the slide about respective horizontal axes, and movable between a closed position and a fully-open position.

In the example shown, jaws 5, 6 of each forming assembly 4 have respective arms 7, 8, which interact with tube 3, extend parallel to a direction B perpendicular to direction A, and are located on opposite sides of tube 3.

Each forming assembly 4 also comprises two facing forming shells 9, 10 hinged to respective jaws 5, 6 and movable between an open position, into which they are pushed by elastic means (not shown), and a closed position, in which they mate to form a space defining the shape and volume of package 2 to be formed in between.

Each forming assembly 4 also comprises an induction sealing device 15 and a cutting device 16 for respectively performing, on each cross section of tube 3 of packaging material gripped between relative jaws 5, 6, an induction heat-seal operation and a cutting operation along the centreline of the cross section.

Figure 2:
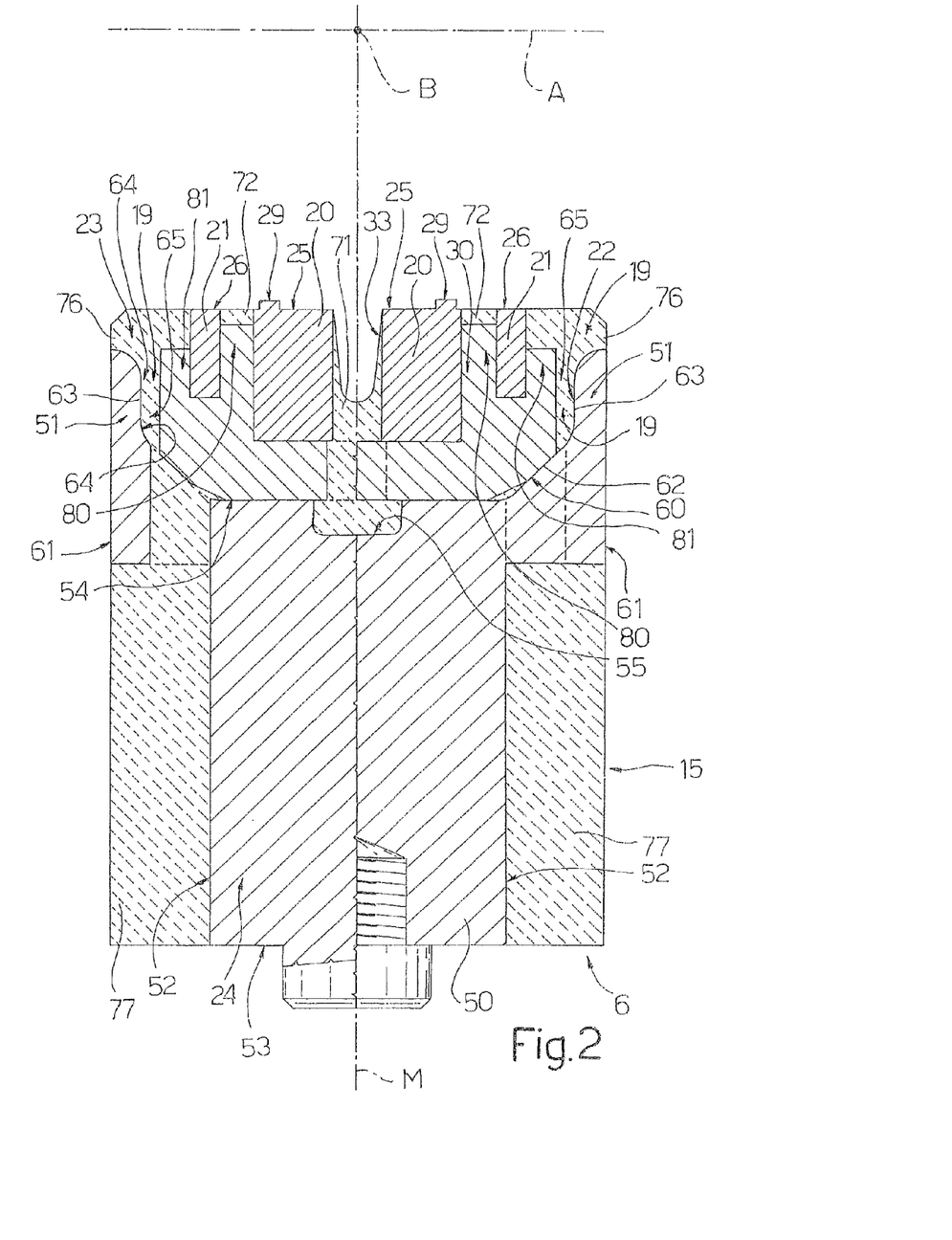
FIG. 2 shows a cross section, in two parallel, offset planes, of an induction sealing jaw in accordance with the present invention and forming part of the FIG. 1 packaging unit.

With reference to FIG. 2, sealing device 15 comprises two pairs of inductors 20, 21, which interact with the packaging material by means of respective active surfaces 25, 26 to perform said induction heat-seal operation on the material.

Sealing device 15 advantageously comprises (FIGS. 2 to 4):
- a supporting body 24 made of heat-conducting material and housing inductors 20, 21;
- an insert 30 made of magnetic flux-concentrating material and housed inside supporting body 24; and
- a member 23 (not shown in FIGS. 3 and 4) made of plastic material and having two portions 19 interposed, in direction A, between supporting body 24 and insert 30, so as to be at least partly surrounded by supporting body 24.

More specifically, supporting body 24 is made of heat-conducting material to cool inductors 20, 21 by transferring the heat produced by the heat-seal operation to jaw 6, which has a much greater heat capacity than inductors 20, 21.

The thermal conductivity of supporting body 24 is preferably at least 10 W/mK.

In the example shown, supporting body 24 is made of aluminium.

Alternatively, supporting body 24 may be made of composite material, ceramic, or metal material other than aluminium.

Member 23 is made by injecting plastic material.

In the example shown, inductors 20, 21 of each sealing device 15 are defined by respective electrically conductive bars extending in direction B and located in pairs on opposite sides of a mid-plane M of supporting body 24. More specifically, plane M is perpendicular to direction A and parallel to direction B.

More specifically, inductors 20 are symmetrical with respect to plane M and interposed between inductors 21, which are located symmetrically on opposite sides of plane M.

Inductors 20, 21 are preferably rectangular in cross section.

Figure 3:
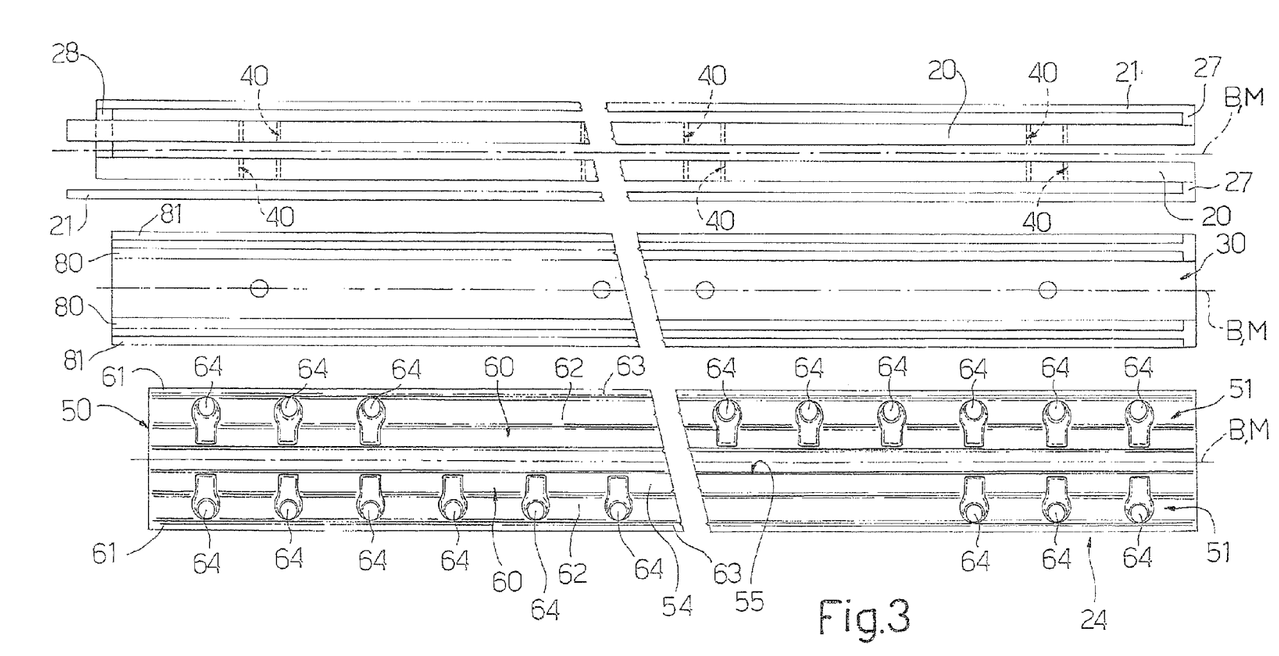
FIG. 3 shows an exploded top plan view, with parts removed for clarity, of the FIG. 1 sealing device.

As shown in FIG. 3, each pair of inductors 20, 21 on the same side of plane M is connected at respective first ends by a bridge 27 extending parallel to direction A.

The inductor 21 on a first side of plane M is connected to the inductor 20 on a second side, opposite the first, of plane M by a bridge 28, which extends parallel to direction A and is located at a different—in use, lower—height than bridges 27 and inductors 20, 21.

More specifically, bridge 28 connects second ends, opposite the first ends, of the inductors 20, 21 located on the first and second side of plane M respectively.

The active surfaces 25, 26 (only shown in FIG. 2) of inductors 20, 21 are preferably rectangular, are elongated in direction B, and extend in the same plane perpendicular to plane M.

Active surfaces 25 are interposed between active surfaces 26 in direction A.

As shown in FIG. 2, respective projections 29, elongated in direction B, project towards tube 3 of packaging material from active surfaces 25. Projections may be either continuous or segmented, extend substantially the whole length of respective active surfaces 25, and serve, during heat sealing, to increase the grip pressure on tube 3.

In a variation not shown, active surfaces 26 may also have respective continuous or segmented longitudinal projections.

Figure 4:
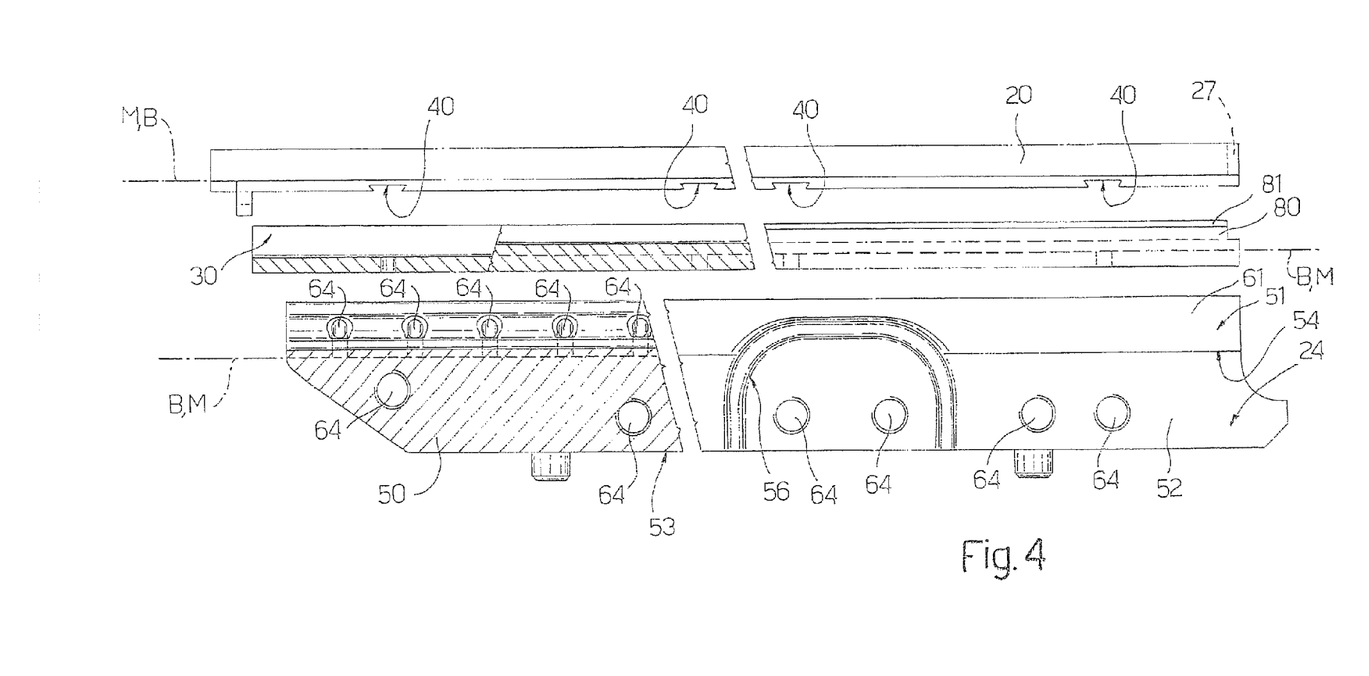
FIG. 4 shows an exploded side view, with parts removed for clarity, of the FIG. 1-3 sealing device.

As shown in FIGS. 3 and 4, lateral walls, parallel to plane M, of inductors 20 have a number of dovetail seats 40.

Seats 40 are through seats and open in a direction parallel to direction A.

The plastic material injected to form member 23 fills seats 40, which exert force on the plastic material, once it sets, to prevent detachment of member 23 from inductors 20, 21.

In a variation not shown, inductors 21 may also be provided with seats 40.

Supporting body 24 is connected integrally by conventional fastening means to arm 8 of jaw 6 of relative forming assembly 4. Alternatively, supporting body 24 may be formed integrally with arm 8 of jaw 6.

More specifically, supporting body 24 comprises a substantially parallelepiped-shaped main portion 50 elongated in direction B; and two fins 51, which project from main portion 50, define a cavity 22 housing inductors 20, 21 and insert 30, and extend symmetrically with respect to plane M.

Main portion 50 comprises two parallel walls 52 in respective planes parallel to plane M; and two walls 53, 54 interposed between walls 52 and in respective planes parallel to direction A.

Wall 53 is connected to jaw 6, and wall 54 has a parallelepiped-shaped seat 55 elongated parallel to direction B and filled with the plastic material forming member 23.

Alternatively, seat 55 may be dovetail-shaped.

Each wall 52 has a semicircular recess 56 (FIG. 4) engaged by a respective opening device on the packaging material.

More specifically, recesses 56 are offset with respect to each other.

Fins 51 diverge, with respect to plane M and in a direction perpendicular to directions A and B, from wall towards inductors 20, 21, and therefore away from wall 53.

Cavity 22 is therefore cup-shaped, is smallest, in direction A, at wall 54, and increases in size, in direction A, from wall 54 towards inductors 20, 21.

Fins 51 project from wall 54 and from respective walls 52 in the opposite direction to wall 53, and each comprise a surface 60, laterally defining cavity 22, and a flat surface 61.

More specifically, surface 60 of each fin 51 faces plane M, and surface 61 of each fin 51 faces away from plane M, on the opposite side of corresponding surface 60.

Each surface 61 is connected at a first end to relative surface 60, and is joined at a second end, opposite the first, to relative wall 52 by an edge perpendicular to plane M.

Each surface 60 comprises a portion 62 (shown in the portion of FIG. 2 on the right of plane M) adjacent to wall 54 and cooperating with insert 30; and a portion 63 cooperating with portion 19 of member 23 and detached, in direction A, from insert 30.

Portions 62, 63 slope with respect to plane M. More specifically, portion 63 slopes less than portion 62 with respect to plane M.

Portions 62, 63, recesses 56, and walls 52 have a number of through holes 64 through which flows the plastic material forming member 23 when set.

More specifically, holes 64 in walls 52 and recesses 56 have respective axes parallel to direction A, and holes 64 in portions 62, 63 have axes parallel to plane M.

One hole 64 of portions 62, 63 is shown in the portion of FIG. 2 on the left of plane M, which shows a section along the axis of hole 64.

Member 23 is made of glass fibre-filled polyphenylene sulphide.

The polyphenylene sulphide preferably contains 40% glass fibre, and is of such a viscosity as to flow correctly during injection.

Advantageously, the polyphenylene sulphide contains no magnetic flux-concentrating material, e.g. ferrite, to avoid impairing the mechanical resistance and toughness of member 23.

With reference to FIG. 2, member 23 is elongated in direction B, and comprises, in addition to portions 19, a portion 71 interposed between inductors 20 and having an end appendix engaging seat 55; and two portions 72 located on opposite sides of plane M, and each interposed between corresponding inductors 20, 21.

More specifically, portions 19 are located on opposite sides of plane M, and each interposed between a respective fin 51 and insert 30.

More specifically, each portion 19 comprises an appendix 65, which is elongated parallel to plane M, cooperates with insert 30 on the plane M side, and cooperates, on the opposite side to insert 30, with portion 63 of relative fin 51.

Each portion 19 also comprises a portion 76 cooperating with respective fin 51 and defining, together with active surfaces 25, 26 and portions 71, 72, a peripheral edge of sealing device 15, on the opposite side to jaw 5.

Portion 71 defines a recess 33 which is symmetrical with respect to plane M, through which plane M extends, and the function of which is explained below.

Portions 72 are located closer to plane M than respective portions 19.

Member 23 also comprises two portions 77, each cooperating with a respective wall 52 of supporting body 24.

Member 23 is formed by a single injection of plastic material, which flows through holes 64 and further holes in insert 30 to form portions 19, 71, 72 and 77.

As the plastic material sets, seats 40, 55 advantageously assist penetration of the plastic material inside inductors 20 and main portion 50 respectively, and, once member 23 is set, prevent detachment of member 23 from supporting body 24 and inductors 20, 21.

Surfaces 61 and the corresponding ends, opposite plane M, of portion 76 define, together with corresponding portions 77, respective opposite peripheral edges of sealing device 15 located on opposite sides of plane M.

Insert 30 is made of composite material containing ferromagnetic material, e.g. ferrite.

More specifically, insert 30 is cup-shaped, and comprises a main portion elongated in direction B and cooperating with wall 54; and two pairs of projections 80, 81 projecting from said main portion, on the opposite side to wall 54, and symmetrical with respect to plane M.

Each projection 80 is interposed between a respective inductor 20 and corresponding inductor 21, and cooperates, on the opposite side to wall 54, with a respective portion 72 of member 23.

Each projection 81 is interposed between a respective inductor 21 and relative portion 19, and cooperates, on the opposite side to plane M, with appendix 65 of relative portion 19.

Projections 80 are interposed between projections 81.

Sealing device 15 also comprises two pressure pads 31 (FIG. 1) made of heat-resistant elastomeric material, preferably nitrile rubber, and housed in respective front cavities of the same shape formed in jaw 5 of relative forming assembly 4 and located symmetrically on opposite sides of plane M. Pressure pads 31 of each jaw 5 cooperate with active surfaces 25, 26 of inductors 20, 21 of relative jaw 6 to grip and heat seal tube 3 on opposite sides of plane M.

With reference to FIG. 1, cutting device 16 comprises a substantially flat cutting member 32, which is housed in sliding manner inside a front seat on jaw 5 of relative forming assembly 4, is movable along plane M, and is activated in known manner, not shown, by a hydraulic cylinder built into jaw 5.

Cutting member 32 is normally maintained in a withdrawn rest position, housed completely inside jaw 5, by known elastic means (not shown), and is moved by the relative hydraulic cylinder into a forward cutting position, in which it projects frontwards from jaw 5, engages recess 33 in sealing device 15 of relative jaw 6, and cuts along the centreline of the relative cross section of tube 3.

Cutting member 32 comprises a platelike base portion integral with the output member of the actuating hydraulic cylinder; and a cutter smaller in thickness, in direction A, than the base portion to ensure high cutting pressure and avoid damaging the packaging material.

The above sealing device 15 is particularly suitable for packaging units on which the cross sections of tube 3 of packaging material are cut before being induction heat sealed.

The advantages of sealing device 15 according to the present invention will be clear from the foregoing description.

In particular, by virtue of portions 19 of member 23 being interposed between insert 30 and fins 51 of supporting body 24, most of the stress to which member 23 is subjected by insert 30 is discharged on fins 51.

In other words, fins 51 form a sort of hoop about respective portions 19 of member 23.

As a result, member 23 is stressed to a lesser degree, so the working life of sealing device 15 is increased and/or sealing device 15 can be operated at faster output rates than the known sealing devices described in the introduction.

Supporting body 24 is also extremely effective in reinforcing plastic member 23 and so improving the effectiveness of sealing device 15.

Clearly, changes may be made to the sealing device as described and illustrated herein without, however, departing from the scope of the present invention as defined in the accompanying Claims.

In particular, sealing device 15 may comprise one pair of inductors 20, 21 or one inductor 20, 21.

The invention claimed is:

1. An induction sealing device for heat sealing packaging material for producing sealed packages of pourable food products and fed in a first direction, said packaging material including an electrically conductive layer, said sealing device comprising:
   inductor means which interact with said packaging material by means of at least one active surface to induce an electric current in the electrically conductive layer of the packaging material;
   a supporting body made of heat-conducting material and housing said inductor means, the supporting body including a main portion and fins protruding from the main portion, the fins bounding a cavity positioned adjacent to the main portion;
   an insert made of magnetic flux-concentrating material housed in said supporting body; and
   a member made of plastic material, and having at least a first portion interposed, in said first direction, between said supporting body and said insert so as to be at least partly surrounded by the supporting body.

2. A device as claimed in claim 1, wherein said supporting body is made of a material of at least 10 W/mK thermal conductivity.

3. A device as claimed in claim 1, wherein said supporting body is made of one of ceramic materials, composite materials, and metal materials.

4. A device as claimed in claim 3, wherein said supporting body is made of aluminum.

5. A device as claimed in claim 1, wherein said supporting body comprises said main portion elongated in a second direction crosswise to said first direction; and said fins projecting from said main portion and defining said cavity housing said inductor means and said insert; said fins diverging from said main portion towards an interaction region in which said inductor means interact with the packaging material.

6. A device as claimed in claim 5, wherein said supporting body comprises a mid-plane crosswise to said first direction; and in that said fins define said cavity on respective opposite sides of said mid-plane.

7. A device as claimed in claim 6, wherein said first portion of said member is elongated in said second direction, and comprises an appendix projecting crosswise to said mid-plane and interposed, in said first direction, between at least one of said fins and said insert.

8. A device as claimed in claim 5, wherein at least one of said fins comprises, from said main portion towards said interaction region, a first portion cooperating with said insert; and a second portion cooperating with said first portion of said member and detached, in said first direction, from said insert.

9. A device as claimed in claim 1, wherein said inductor means comprise an electrically conductive first bar defining said active surface; and an electrically conductive second bar defining a further active surface.

10. A device as claimed in claim 9, wherein said second bar is interposed, in said first direction, between said first portion and a second portion of said member; and said first bar is interposed, in said first direction, between said second portion and a third portion of said member.

11. A device as claimed in claim 10, wherein a mid-plane extends through said third portion of said member; and said main portion of said supporting body defines a seat engaged by one end of said third portion of said member.

12. A device as claimed in claim 10, wherein said first and said second bars extend in a second direction, are connected by a first bridge made of electrically conductive material, and are both located on a first side of a mid-plane.

13. A device as claimed in claim 12, comprising a further first and a further second bar, which are both located on a second side, opposite said first side, of said mid-plane, and are connected by a further first bridge.

14. A device as claimed in claim 13, wherein said first bar located on one of said first side and said second side of said mid-plane is connected electrically by a second bridge to said second bar located on the other of said first side and said second side of the mid-plane.

15. A device as claimed in claim 9, wherein at least one of said first bar and said second bar defines at least one dovetail-shaped seat engaged by said member and for preventing detachment of the member from said at least one of said first bar and said second bar.

16. A device as claimed in claim 1, wherein said supporting body comprises a lateral wall defining a recess located at a side of a mid-plane and shaped to at least partly house an opening device on said packaging material.

17. A device as claimed in claim 1, wherein said member is made of polyphenylene sulphide.

18. A device as claimed in claim 17, wherein said polyphenylene sulphide contains a glass fibre filler and no magnetic flux-concentrating material.

19. A packaging unit for producing sealed packages of a pourable food product from a tube of packaging material fed in a first direction and filled continuously with said food product, said unit comprising at least two pairs of jaws which act cyclically and successively on said tube to grip the tube at equally spaced cross sections; and an induction sealing device fitted to each pair of said jaws to heat seal the packaging material at said cross sections; wherein said sealing device is the sealing device as claimed in claim 1.

20. A device as claimed in claim 1, wherein the member made of plastic material contacts the supporting body and the insert.

21. An induction sealing device for heat sealing a multi-layer packaging material of sealed packages of pourable food products fed in a first direction, the multilayer packaging material including an electrically conductive layer and a plastic material layer, the induction sealing device comprising:
   a supporting body surrounding a cavity and formed of a heat-conducting material, the supporting body including a main portion positioned adjacent the cavity and fins protruding from the main portion, the fins bounding the cavity;
   an inductor positioned in the cavity and configured to be powered by a current generator, the inductor possessing at least one active surface which induces an electric current in the electrically conductive layer of the packaging material, when the inductor is powered by the current generator, to heat the electrically conductive layer of the packaging material and thereby melt the plastic material layer;

an insert positioned in the cavity and formed of a magnetic flux-concentrating material; and a plastic member positioned in the cavity between the supporting body and the insert so that the supporting body, the plastic member and the insert are arranged sequentially in the first direction, the plastic member being formed of a material different from the magnetic flux-concentrating material of the insert.

22. An induction sealing device as claimed in claim 21, wherein the plastic member contacts the supporting body and the insert.

23. An induction sealing device for heat sealing packaging material for producing sealed packages of pourable food products fed in a first direction, the packaging material including an electrically conductive layer, the induction sealing device comprising:

a supporting body formed of a heat-conducting material, the supporting body including a main portion extending crosswise relative to the first direction and fins protruding from the main portion, wherein the fins bound a cavity positioned adjacent to the main portion;

an inductor possessing at least one active surface configured to induce an electric current in the electrically conductive layer of the packaging material, the inductor being positioned in the cavity;

an insert formed of a magnetic flux-concentrating material and positioned in the cavity; and a plastic member possessing an appendix portion extending crosswise relative to the first direction, the appendix portion being positioned in the cavity between the insert and at least one of the fins.

24. The induction sealing device of claim 23, wherein the magnetic flux-concentrating material of the insert is different from the heat-conducting material of the supporting body.

\* \* \* \* \*